United States Patent
Yabushita

(10) Patent No.: US 11,018,901 B2
(45) Date of Patent: May 25, 2021

(54) GATEWAY AND COMMUNICATION CONTROL METHOD

(71) Applicant: NEC Corporation, Tokyo (JP)

(72) Inventor: Naoya Yabushita, Tokyo (JP)

(73) Assignee: NEC CORPORATION, Tokyo (JP)

(*) Notice: Subject to any disclaimer, the term of this patent is extended or adjusted under 35 U.S.C. 154(b) by 129 days.

(21) Appl. No.: 16/483,094

(22) PCT Filed: Feb. 9, 2018

(86) PCT No.: PCT/JP2018/004510
§ 371 (c)(1),
(2) Date: Aug. 2, 2019

(87) PCT Pub. No.: WO2018/151021
PCT Pub. Date: Aug. 23, 2018

(65) Prior Publication Data
US 2020/0014562 A1    Jan. 9, 2020

(30) Foreign Application Priority Data

Feb. 14, 2017  (JP) .............................. JP2017-025168

(51) Int. Cl.
*H04L 12/66* (2006.01)
*H04B 7/14* (2006.01)
*H04L 12/841* (2013.01)

(52) U.S. Cl.
CPC .............. *H04L 12/66* (2013.01); *H04B 7/14* (2013.01); *H04L 47/28* (2013.01)

(58) Field of Classification Search
CPC ............ H04L 12/66; H04L 47/28; H04B 7/14
See application file for complete search history.

(56) References Cited

U.S. PATENT DOCUMENTS

| | | | |
|---|---|---|---|
| 10,162,577 B2 | 12/2018 | Saito | |
| 2009/0238205 A1 | 9/2009 | Wang et al. | |
| 2017/0315762 A1* | 11/2017 | Saito | ..................... G06F 3/1239 |

FOREIGN PATENT DOCUMENTS

| | | |
|---|---|---|
| EP | 2 051 537 A1 | 4/2009 |
| JP | 2000-152315 A | 5/2000 |

(Continued)

OTHER PUBLICATIONS

International Search Report in International Application No. PCT/JP2018/004510, dated May 1, 2018.

(Continued)

*Primary Examiner* — Siming Liu

(57) ABSTRACT

The present invention addresses the problem of providing a gateway and a communication control method which make it possible to manage both a quasi-associated network and an associated network appropriately. A gateway and a communication control method of the present disclosure: interconnect a Public Switched Telephone Network (PSTN) and an Internet Protocol (IP) network; receive, via a certain link set, a signal including information indicating a transmission-source signal station; and determine the type of the network from which the signal has been transmitted, on the basis of a determination as to whether a signal station which is adjacent via the link set used for communicating the received signal corresponds to the transmission-source signal station indicated by the information included in the received signal.

9 Claims, 5 Drawing Sheets

(56) References Cited

FOREIGN PATENT DOCUMENTS

| | | |
|---|---|---|
| JP | 2013-211664 A | 10/2013 |
| JP | 2016-119581 A | 6/2016 |
| JP | 2016-158225 A | 9/2016 |

OTHER PUBLICATIONS

Written Opinion in International Application No. PCT/JP2018/004510, dated May 1, 2018.
"Matters to be Considered on Statement in Technical-Condition-Set Appended Table 3 (MTP Specification)", Internet <URL: https://www.ntteast.co.jp/infost/constip/cons1/pdf/gijutsu/betsu3.pdf>.

* cited by examiner

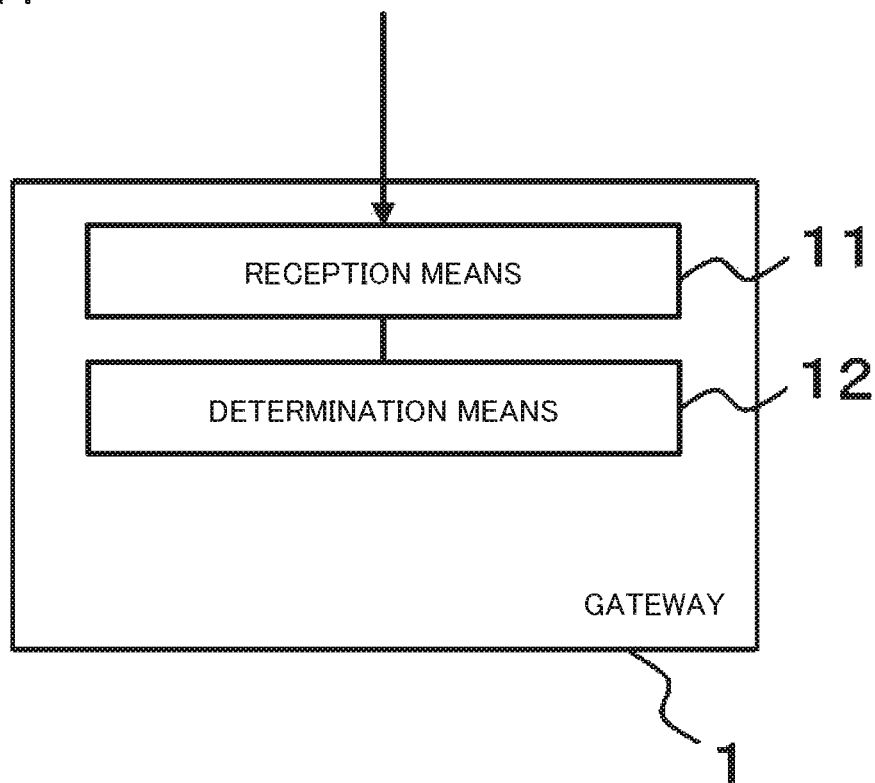

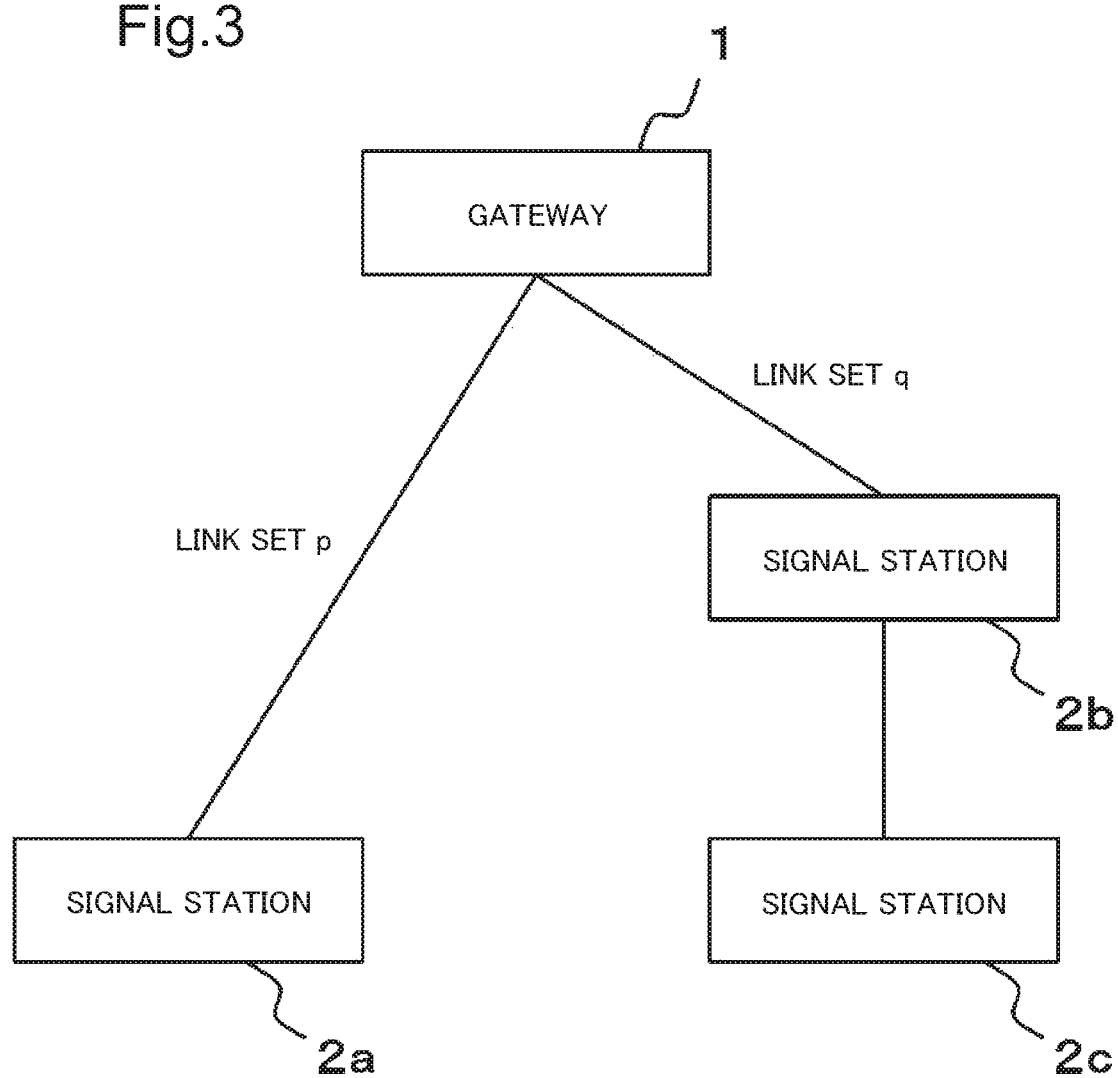

GATEWAY AND COMMUNICATION CONTROL METHOD

This application is a National Stage Entry of PCT/JP2018/004510 filed on Feb. 9, 2018, which claims priority from Japanese Patent Application 2017-025168 filed on Feb. 14, 2017, the contents of all of which are incorporated herein by reference, in their entirety.

TECHNICAL FIELD

The present invention relates to a gateway and a communication control method.

BACKGROUND ART

At present, there is used a quasi-associated network of a public switched telephone network (PSTN) that is a configuration in which an architectural synchronous transfer mode (STM) module (ASM) and a signaling gateway (SG) are connected to each other via a signal transfer point (STP) such as a multi-protocol signal transfer point (MSTP). However, it is assumed that accompanying aging and discontinuation of MSTPs, quasi-associated networks of PSTNs are shifted in turn to associated network of IP (Internet Protocol) network that is a configuration in which an ASM and an SG are connected directly to each other. This shift is called PSTN migration.

NPL 1 describes that a value different between a quasi-associated network and an associated network is defined as a timer value (T6 timer value) for monitoring congestion of an opposite station. In a transition period until completion of the PSTN migration, a T6 timer value is different between the quasi-associated network and the associated network, and thus, it is necessary to take a measure of providing both an SG for the quasi-associated network and an SG for the associated network. However, providing both an SG for the quasi-associated network and an SG for the associated network results in necessity of large equipment investment cost.

In order to solve such a problem, for example, it can be considered that a single SG sets respective T6 timer values that vary depending on networks to which connection is made.

CITATION LIST

Patent Literature

[PTL 1] Japanese Unexamined Patent Application Publication No. 2013-211664

Non Patent Literature

[NPL 1] "Matters to be Considered on Statement in Technical-Condition-Set Appended Table 3 (MTP Specification)", [online], [Search on Dec. 2, 2016], Internet <URL: https://www.ntt-east.co.jp/info-st/constip/cons1/pdf/gi-jutsu/betsu3.pdf>

SUMMARY OF INVENTION

Technical Problem

Considered examples of a method of addressing, with a single SG, a difference in a T6 timer value between a quasi-associated network and an associated network includes a method of setting a T6 timer value for each group that is a collection of link sets. However, in this method, there is a possibility that when the link set is physically replaced or added, a difference occurs between a T6 timer value set for the link set included in the group and an appropriate T6 timer value based on a type of a network actually connected to the link set. For this reason, a single SG cannot appropriately manage both the quasi-associated network and the associated network.

In view of the above-described problem, an object of various aspects in the present disclosure is to provide a gateway and a communication control method capable of appropriately managing both a quasi-associated network and an associated network.

Solution to Problem

A gateway, according to the first aspect of the present disclosure, performing a relay between a public switched telephone network (PSTN) and an Internet protocol (IP) network, includes: reception means for receiving, via a certain link set, a signal including information that represents a signal station of a transmission source; and determination means for determining a type of a network from which the signal has been transmitted, based on whether or not a signal station adjacent to the gateway via the certain link set corresponds with the signal station of the transmission source represented by the information.

A communication control method, according to the second aspect of the present disclosure, for performing a relay between a public switched telephone network (PSTN) and an Internet protocol (IP) network, includes: receiving, via a certain link set, a signal including information that represents a signal station of a transmission source; and determining a type of a network from which the signal has been transmitted, based on determination of whether or not a signal station adjacent via the certain link set corresponds with the signal station of the transmission source represented by the information.

Advantageous Effects of Invention

Various aspects in the present disclosure can provide a gateway and a communication control method capable of appropriately managing both a quasi-associated network and an associated network.

BRIEF DESCRIPTION OF DRAWINGS

FIG. 1 is a diagram illustrating an example of a configuration of a gateway according to an aspect of the present disclosure.

FIG. 2 is a diagram illustrating an example of adjacent-signal-station information according to an aspect of the present disclosure.

FIG. 3 is a diagram illustrating an example of a configuration of a system according to an aspect of the present disclosure.

EXAMPLE EMBODIMENT

Figure 4:
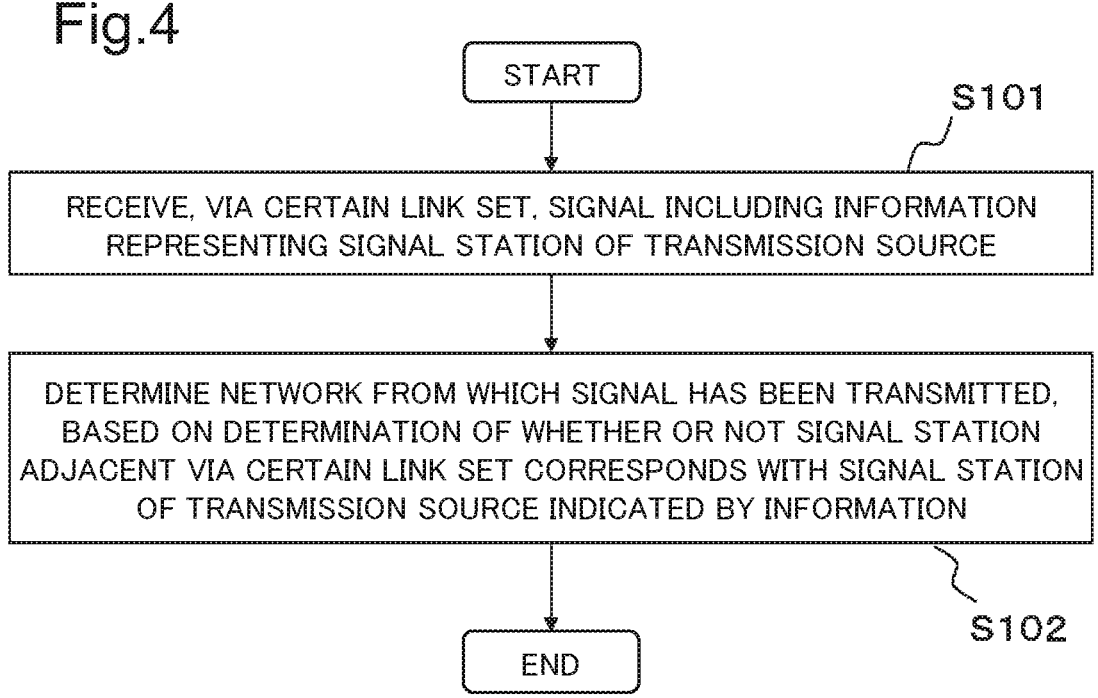
FIG. 4 is a diagram illustrating an example of operation of communication control according to an aspect of the present disclosure.

A configuration of each device in the present disclosure is represented by a block of a functional unit. Each of the functions is implemented by an arbitrary combination of hardware and software, and there are various modified examples for the implementation method and device. The following example embodiments are merely exemplifications, and various configurations and combinations other than the following may be adopted.

FIG. 1 is a diagram illustrating a configuration of a gateway according to an aspect of the present disclosure. A gateway 1 illustrated in FIG. 1 includes a reception means 11 and a determination means 12. The gateway 1 is a device having a function of performing a relay between a PSTN and an IP network, and for example, may be a SG and the like defined as a technique compliant with the third generation partnership project (3GPP), but is not limited to this.

The reception means 11 receives, via a certain link set, a signal including information that represents a signal station of a transmission source. In a quasi-associated network and an associated network, the signal stations of the transmission sources are ASMs, for example. The determination means 12 determines whether or not a signal station adjacent to the gateway 1 via the link set used in the communication of the signal received by the reception means 11 corresponds with the signal station of the transmission source represented by the information included in the signal received by the reception means 11, and based on the determination result, determines a type of a network from which the signal has been transmitted.

For example, the determination means 12 specifies the link set used at the time of the reception of the signal when the reception means 11 receives a signal. Then, the determination means 12 specifies the signal station adjacent to the gateway 1 via the specified link set.

FIG. 2 is a diagram illustrating one example of adjacent-signal-station information that is information in which link sets connected to the gateway 1 are associated with signal stations adjacent to the gateway 1 via the respective link sets. The gateway 1 may store the adjacent-signal-station information as illustrated in FIG. 2, or may receive the adjacent-signal-station information from another device or the like.

By referring to the adjacent-signal-station information as illustrated in FIG. 2 for example, the determination means 12 may specify the signal station adjacent to the gateway 1 via the link set, based on the information of the signal station associated with the specified link set. For example, in the case of referring to the adjacent-signal-station information illustrated in FIG. 2, when specifying that the signal is received from the link set p, the determination means 12 may specify that the signal station adjacent to the gateway 1 via the link set p is A. Similarly, for example, when specifying that the signal is received from the link set q, the determination means 12 may specify that the signal station adjacent to the gateway 1 via the link set q is B.

The determination means 12 specifies the signal station of the transmission source represented by information included in the signal received by the reception means 11. The determination means 12 may specify the signal station of the transmission source, for example, by referring to a signal station code that is set by the signaling connection control part (SCCP) and that is included in the signal received by the reception means 11. The SCCP is a protocol for transferring, in a common channel signaling network, information for a supplementary service such as database inquiry. The signal station code set by the SCCP is prescribed by JT-Q713, and is represented by two octets, for example.

The determination means 12 determines whether or not the signal station adjacent to the gateway 1 via the link set used in the communication of the signal received by the reception means 11 corresponds with the signal station of the transmission source represented by the information included in the signal received by the reception means 11. Then, based on the determination result, the determination means 12 determines a type of a network from which the signal has been transmitted.

Specifically, for example, when determining that the signal station adjacent to the gateway 1 via the link set used in the communication of the signal received by the reception means 11 corresponds with the signal station of the transmission source represented by the information included in the signal received by the reception means 11, the determination means 12 determines that the signal has been transmitted from the signal station existing in an associated network, for example. Meanwhile, for example, when determining that the signal station adjacent to the gateway 1 via the link set used in the communication of the signal received by the reception means 11 does not correspond with the signal station of the transmission source represented by the information included in the signal received by the reception means 11, the determination means 12 determines that the signal has been transmitted from the signal station existing in a quasi-associated network, for example.

Here, description is made on the reason why an aspect of the present disclosure specifies the signal station adjacent to the gateway 1 via the link set used at the time of the reception of the signal, based on the adjacent-signal-station information, and the reason why an aspect of the present disclosure specifies the signal station of the transmission source of the received signal by using the signal station code set by the SCCP. Further, description is made on the reason why an aspect of the present disclosure determines a type of a network, based on correspondence between the signal stations in the above-described two specified results.

Description is made by citing, as an example, operation of the case where a signal station 2c transmits a signal to the gateway 1 in a system illustrated in FIG. 3 for example.

At the time of transmitting a signal, the signal station 2c sets a signal station code "C" indicating the signal station, in an origination point code (OPC) field of a routing label of the signal, and transmits the signal.

Here, when a routing method used by a signal station 2b for transmitting a signal is the global title routing, at the time that the signal passes through the signal station 2b as an MSTP, "C" that is the signal station code set in the OPC field is converted into "B" that is a signal station code of the signal station 2b. The global title routing is a routing function of using the signaling connection control part (SCCP), and thereby carrying a signal message to a signal station, based on the telephone number or the like. Meanwhile, when a routing method of the signal station 2c is the message transfer part (MTP) routing, at the time that the signal passes through the signal station 2b, "C" that is the signal station code stored in the OPC field is not converted into "B" that is the signal station code of the signal station 2b.

As a routing method of the signal station 2b, either the global title routing or the MTP routing is adopted depending on a purpose of a signal, and the gateway 1 (e.g., a SG) cannot distinguish a routing method of the signal station 2c. Thus, when the gateway 1 refers to a signal station code set in an OPC field of a signal transmitted from the signal station 2c, there exist both of a possibility that the signal station code represents the signal station 2b and a possibility that the signal station code represents the signal station 2c. For this reason, even when referring to a signal station code set in an OPC field of a received signal, the gateway 1 cannot specify whether the signal station code is that of the adjacent signal station or is that of the signal station of the transmission source.

In view of it, according to an aspect of the present disclosure, the determination means 12 determines a signal station adjacent to the gateway 1 via a specified link set, based on the adjacent-signal-station information, instead of specifying a signal station adjacent to the gateway 1 via a link set used at the time of reception of a signal, based on a signal station code set in an OPC field of the received signal.

Further, when transmitting a signal, the signal station 2c sets, in an OPC field of a routing label of the signal, a signal station code "C" indicating the signal station, and then transmits the signal. In this case, basically, by checking the OPC field of the routing label of the received signal, the gateway 1 can specify the signal station that has transmitted the signal. However, as described above, when a routing method used by the signal station 2b for transmitting the signal is the global title routing, at the time that the signal passes through the signal station 2b as an MSTP, "C" that is the signal station code set in the OPC field is converted into "B" that is a signal station code of the signal station 2b.

In view of it, according to an aspect of the present disclosure, the determination means 12 does not specify a signal station of a transmission source of a signal, based on a signal station code set in an OPC field of the received signal, but specifies a signal station of a transmission source by referring to a signal station code set by the SCCP and included in a signal received by the reception means 11. The reason why the signal station code set by the SCCP is used here is that the signal station code set by the SCCP is not converted even in each of the case of the MTP routing and the case of the global title routing.

Then, according to an aspect of the present disclosure, the determination means 12 determines whether or not a signal station adjacent to the gateway 1 via a link set used in communication of a signal received by the reception means 11 corresponds with a signal station of a transmission source represented by information included in the signal received by the reception means 11. Here, when the signal stations indicated by both correspond with each other, the determination means 12 determines that the signal is transmitted from the signal station adjacent via the link set used in the communication of the received signal. In other words, in such a case, the determination means 12 can determine that the signal is transmitted from the signal station in an associated network. Meanwhile, when the signal stations indicated by both do not correspond with each other, the determination means 12 determines that the signal is not transmitted from the signal station adjacent via the link set used in the communication of the received signal. In other words, in such a case, the determination means 12 can determine that the signal is transmitted from the signal station in a quasi-associated network.

FIG. 4 is a flowchart illustrating an example of operation of communication control according to an aspect of the present disclosure. According to FIG. 4, at a step S101, a signal including information that represents a signal station of a transmission source is received via a certain link set. At a step S102, a network from which the signal has been transmitted is determined based on determination of whether or not a signal station adjacent via the link set used in the communication of the signal received at the step S101 corresponds with the signal station of the transmission source represented by the information included in the signal received at the step S101. This operation is implemented by the gateway 1, for example. Specifically, the processing at the step S101 is implemented by the reception means 11, for example, and the processing at the step S102 is implemented by the determination means 12, for example.

From a standpoint, in the present aspect, the following processing may be implemented. In the determination processing at the step S102, when it is determined in the determination that the signal stations correspond with each other, it may be determined that the signal received at the step S101 has been transmitted from the signal station in an associated network. Meanwhile, in the determination processing at the step S102, when it is determined in the determination that the signal stations do not correspond with each other, it may be determined that the signal received at the step S101 has been transmitted from the signal station in a quasi-associated network.

FIG. 3 is a diagram illustrating an example of a configuration of the system according to an aspect of the present disclosure. The system illustrated in FIG. 3 includes the gateway 1, a signal station 2a, the signal station 2b, and the signal station 2c. The gateway 1 and the signal station 2a are connected to each other via the link set p. The gateway 1 and the signal station 2b are connected to each other via the link set q. The signal station 2b and the signal station 2c are connected to each other via a certain link set. It is assumed that a signal station code of the signal station 2a is "A", the signal station code of the signal station 2b is "B", and the signal station code of the signal station 2c is "C". It is assumed that the gateway 1 holds the adjacent-signal-station information illustrated in FIG. 2. Cited examples of the signal station 2a and the signal station 2c may be ASMs, but are not limited to this. A cited example of the signal station 2b may be an MSTP, but is not limited to this.

Description is made on operation when the signal station 2a transmits a signal to the gateway 1 in the system illustrated in FIG. 3. The gateway 1 receives, via the link set p, the signal transmitted by the signal station 2a. This operation is implemented by the reception means 11, for example. The gateway 1 refers to the adjacent-signal-station information illustrated in FIG. 2, and thereby specifies that a signal station code of the signal station adjacent to the gateway 1 via the link set p is "A". The gateway 1 refers to a signal station code set by the SCCP and included in the received signal, and thereby specifies that the signal station code of a signal station of a transmission source is "A". The gateway 1 determines whether or not the signal station code of the signal station adjacent to the gateway 1 via the link set p corresponds with the signal station code set by the SCCP and included in the received signal. This operation is implemented by the determination means 12, for example. In such a case, since each of these signal station codes is "A", the gateway 1 determines that these signal station codes correspond with each other. In this case, the gateway 1 can determine that the received signal has not been transmitted via the signal station 2b (e.g., an MSTP). In other words, the gateway 1 can determine that the received signal has been transmitted in an associated network.

Description is made on operation when the signal station 2c transmits a signal to the gateway 1 in the system illustrated in FIG. 3. The gateway 1 receives, via the link set q, the signal transmitted by the signal station 2c. This operation is implemented by the reception means 11, for example. The gateway 1 refers to the adjacent-signal-station information illustrated in FIG. 2, and thereby specifies that a signal station code of the signal station adjacent to the gateway 1 via the link set q is "B". The gateway 1 refers to a signal station code set by the SCCP and included in the received signal, and thereby specifies that the signal station code of a signal station of a transmission source is "C". The gateway 1 determines whether or not the signal station code of the signal station adjacent to the gateway 1 via the link set q corresponds with the signal station code set by the SCCP and included in the received signal. This operation is implemented by the determination means 12, for example. In such a case, the signal station code of the signal station adjacent to the gateway 1 via the link set q is "B", the signal station code set by the SCCP and included in the received signal is "C", and thus, these signal station codes are different from each other. Accordingly, the gateway 1 determines that the signal station code of the signal station adjacent to the gateway 1 via the link set q does not correspond with the signal station code set by the SCCP and included in the received signal. In this case, the gateway 1 can determine that the received signal has been transmitted via the signal station 2b (e.g., an MSTP). In other words, the gateway 1 can determine that the received signal has been transmitted in a quasi-associated network.

According to an aspect of the present disclosure, a signal including information that represents a signal station of a transmission source is received via a certain link set, and a type of a network from which the signal has been transmitted is determined based on determination of whether or not a signal station adjacent via the link set used in the communicate of the received signal corresponds with the signal station of the transmission source represented by the information included in the received signal. Thereby, according to an aspect of the present disclosure, without newly holding additional information of a signal station or giving additional information to a signal, it is possible to determine whether a received signal has been transmitted via an MSTP, or has been transmitted from an adjacent signal station. In other words, according to an aspect of the present disclosure, a quasi-associated network and an associated network can be distinguished. For this reason, an aspect of the present disclosure can provide a gateway and a communication control method capable of appropriately managing both a quasi-associated network and an associated network by simply switching a T6 timer value, depending on the distinguishing. Providing the gateway and the communication control method capable of appropriately managing both a quasi-associated network and an associated network brings a network administrator an advantage that flexible equipment renewal directed at the PSTN migration and suppression of the number of necessary pieces of equipment can be expected.

The reason is as follows. Until completion of the PSTN migration, an SG corresponding to associated network connection and an SG corresponding to quasi-associated network connection are necessary for the time being. In the present situation, the SG corresponding to the quasi-associated network connection needs to be partially renewed in consideration of a timing of the migration completion, but there is a possibility that the SG becomes unnecessary when the migration is completed. In view of it, when an old SG can be renewed with an SG that pertains to an aspect of the present disclosure and that is corresponding to both the associated network connection and the quasi-associated network connection, the SG can be continuously operated as an SG corresponding to the associated network connection also after the migration is completed. Thus, by providing the SG corresponding to both the associated network connection and the quasi-associated network connection in a transition period of the PSTN migration, the SG can be operated as an SG that has a function for the quasi-associated network connection and that is continuously corresponding to the associated network connection also after the migration completion.

Figure 5:
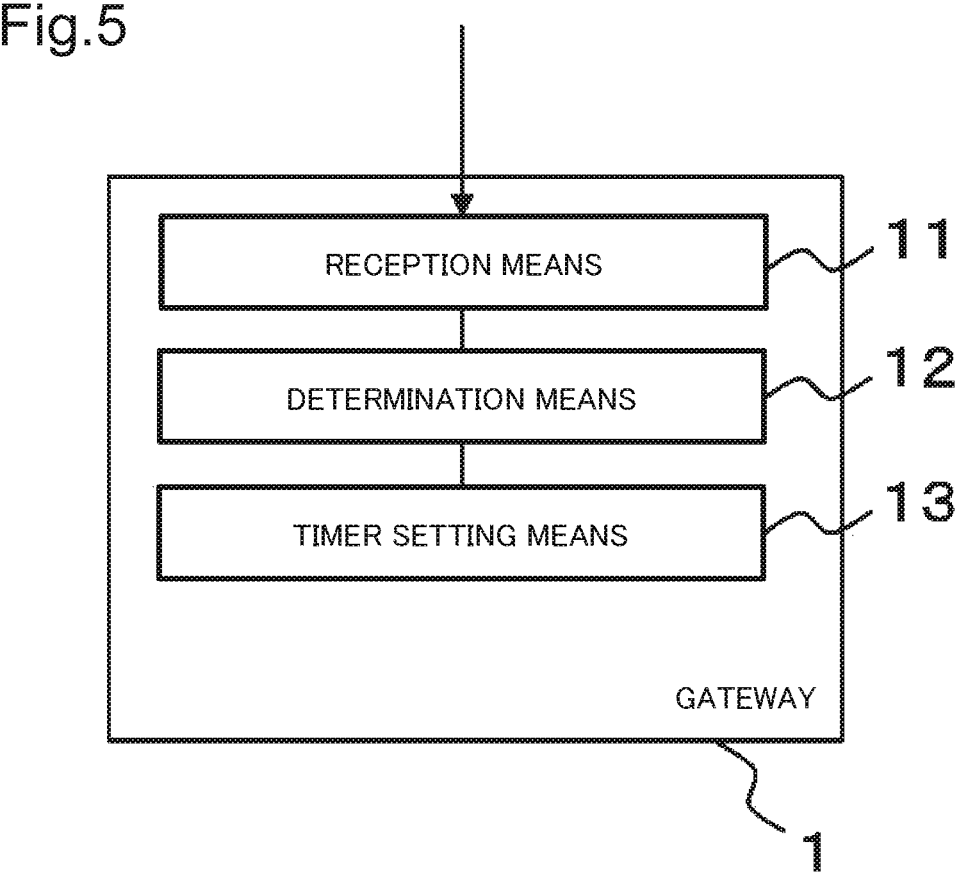
FIG. 5 is a diagram illustrating an example of a configuration of a gateway according to a modified example of an aspect of the present disclosure.

FIG. 5 is a diagram illustrating a configuration of a gateway according to a modified example of an aspect of the present disclosure. A gateway 1 illustrated in FIG. 5 includes a reception means 11, a determination means 12, and a timer setting means 13. The timer setting means 13 sets, depending on determination by the determination means 12, a timer value (e.g., a T6 timer value) for monitoring congestion.

Specifically, the reception means 11 receives, via a certain link set, a signal including information that represents a signal station of a transmission source. At this time, for example, the determination means 12 determines that a signal station adjacent to the gateway 1 via the link set used in the communication of the signal received by the reception means 11 corresponds with the signal station of the transmission source represented by the information included in the signal received by the reception means 11. In such a case, the timer setting means 13 may set a timer value (e.g., three seconds) that depends on an associated network and that is for monitoring congestion. Alternatively, the reception means 11 receives, via a certain link set, a signal including information that represents a signal station of a transmission source. At this time, for example, the determination means 12 determines that a signal station adjacent to the gateway 1 via the link set used in the communication of the signal received by the reception means 11 does not correspond with the signal station of the transmission source represented by the information included in the signal received by the reception means 11. In such a case, the timer setting means 13 may set a timer value (e.g., five seconds) that depends on a quasi-associated network and that is for monitoring congestion.

Figure 6:
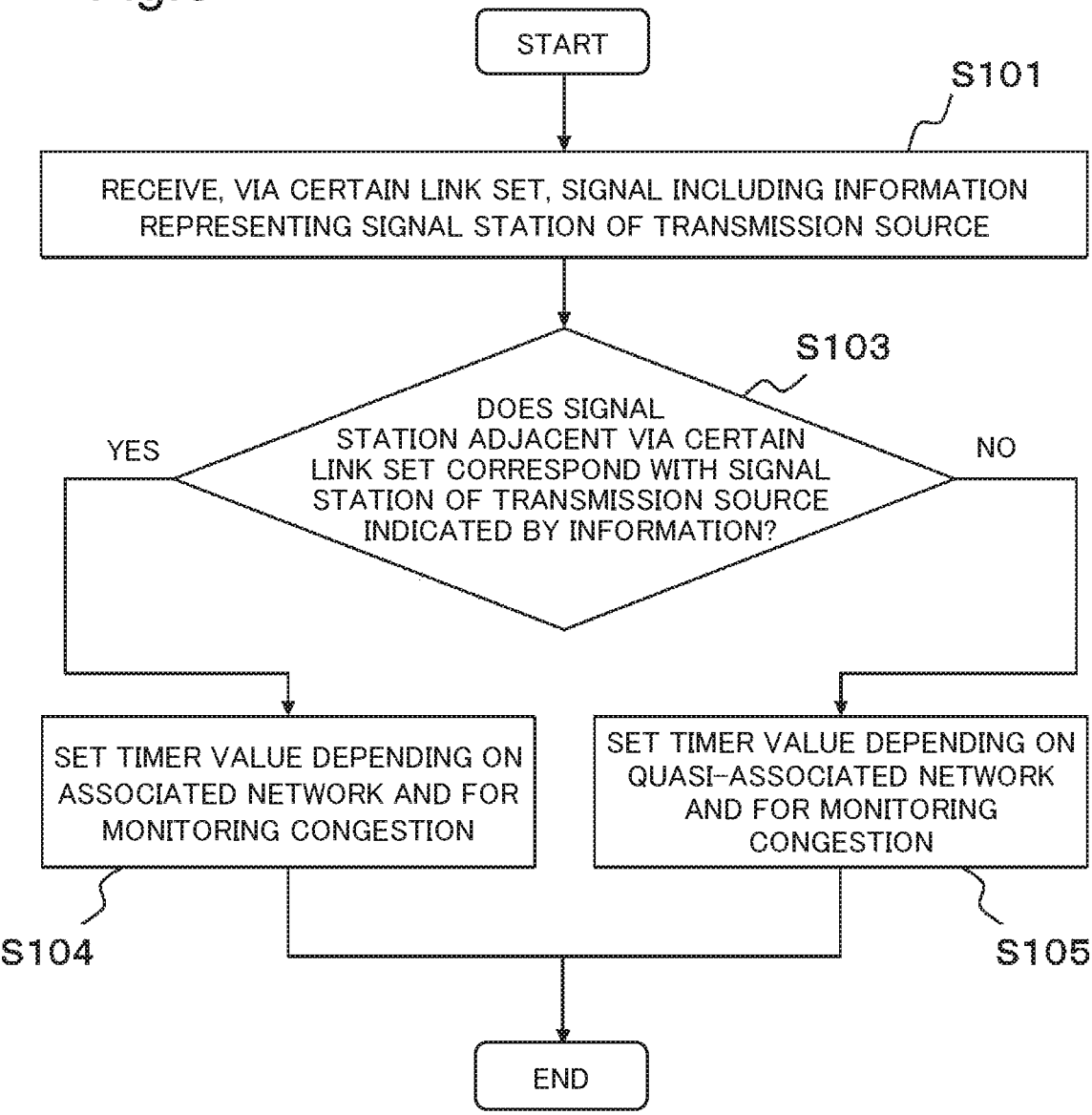
FIG. 6 is a diagram illustrating an example of operation of communication control according to a modified example of an aspect of the present disclosure.

FIG. 6 is a flowchart illustrating operation of communication control according to a modified example of an aspect of the present disclosure. According to FIG. 6, at a step S101, a signal including information that represents a signal station of a transmission source is received via a certain link set. At a step S103, it is determined whether or not a signal station adjacent via the link set used in the communication of the signal received at the step S101 corresponds with the signal station of the transmission source represented by the information included in the signal received at the step S101. When it is determined at the step S103 that the signal stations correspond with each other ("yes" at the step S103), the step control flow proceeds from the step S103 to a step S104. At the step S104, a timer value that depends on an associated network and that is for monitoring congestion is set. When it is determined at the step S103 that the signal stations do not correspond with each other ("no" at the step S103), the step control flow proceeds from the step S103 to a step S105. At the step S105, a timer value that depends on a quasi-associated network and that is for monitoring congestion is set. This operation is implemented by the gateway 1, for example. Specifically, the processing at the step S101 is implemented by the reception means 11, for example, and the processing at the step S103 is implemented by the determination means 12, for example. Similarly, the processing at the step S104 and the step S105 is implemented by the timer setting means 13, for example.

In a modified example of an aspect of the present disclosure, a timer value for monitoring congestion is set depending on determination of the determination means 12. Specifically, in a modified example of an aspect of the present disclosure, when it is determined by determination of the determination means 12 that the signal has been transmitted in a quasi-associated network, a timer value for the quasi-associated network and for monitoring congestion is set. Further, in a modified example of an aspect of the present disclosure, when it is determined by determination of the determination means 12 that the signal has been transmitted in an associated network, a timer value for the associated network and for monitoring congestion is set. Thereby, according to a modified example of an aspect of the present disclosure, it is possible to provide the gateway and the communication control method capable of appropriately managing both a quasi-associated network and an associated network.

Considered examples of a method of addressing, with a single SG, a difference in a T6 timer value between a quasi-associated network and an associated network in a transition period until completion of the PSTN migration includes a method of setting a T6 timer value for each group that is a collection of link sets. However, in this method, there is a possibility that when the link set is physically replaced or added, a difference occurs between a T6 timer value and a type of a connected network. For this reason, both a quasi-associated network and an associated network cannot be appropriately managed, and both an SG for a quasi-associated network and an SG for an associated network are needed. Then, as long as this method is used, there is a problem that large equipment investment cost is needed. According to a modified example of an aspect of the present disclosure, the gateway and the communication control method capable of appropriately managing both a quasi-associated network and an associated network can be provided, and the above-described problem can be solved.

Figure 7:
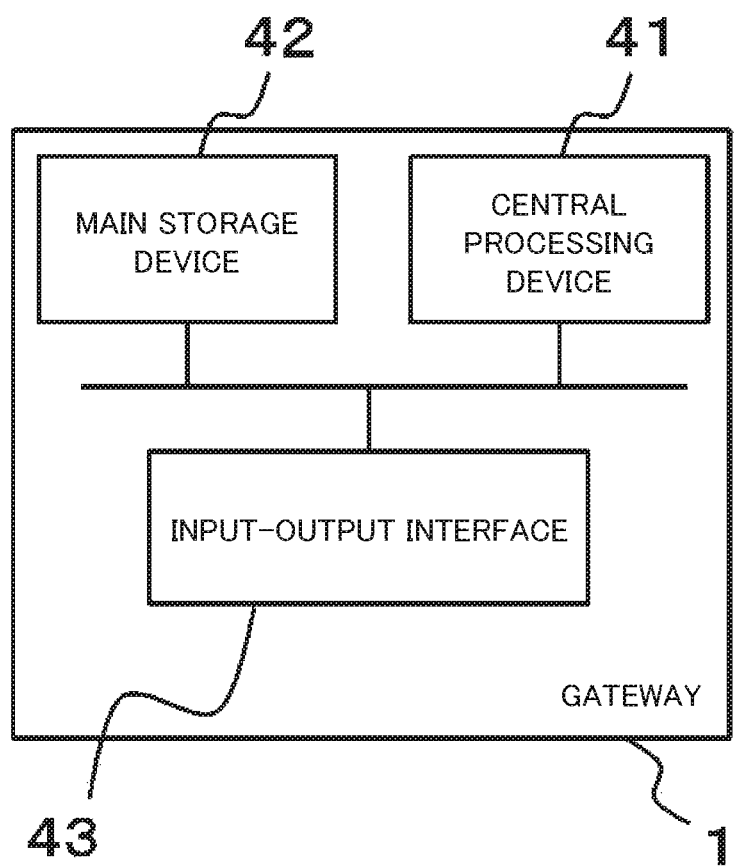
FIG. 7 is a diagram illustrating an example of a hardware configuration of a gateway according to an aspect of the present disclosure.

As illustrated in FIG. 7, the gateway 1 is constituted by hardware including a central processing device 41, a main storage device 42, an input-output interface 43, and the like. The gateway 1 may include an auxiliary storage device. The reception means 11 is implemented by the input-output interface 43, for example. The determination means 12 is implemented by the central processing device 41 and the main storage device 42, for example. The timer setting means 13 is implemented by the central processing device 41 and the main storage device 42, for example.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-025168, filed on Feb. 14, 2017, the disclosure of which is incorporated herein in its entirety by reference.

REFERENCE SIGNS LIST

1 Gateway
11 Reception means
12 Determination means
13 Timer setting means
2a Signal station
2b Signal station
2c Signal station
41 Central processing device
42 Main storage device
43 Input-output interface

What is claimed is:

1. A gateway performing a relay between a public switched telephone network (PSTN) and an Internet protocol (IP) network, the gateway comprising:
   a reception unit configured to receive, via a certain link set, a signal including information that represents a signal station of a transmission source; and
   a determination unit configured to determine a type of a network from which the signal has been transmitted, based on whether or not a signal station adjacent to the gateway via the certain link set corresponds with the signal station of the transmission source represented by the information.

2. The gateway according to claim 1, further comprising:
   a timer setting unit configured to set, depending on determination of the type of the network, a timer value for monitoring congestion.

3. The gateway according to claim 2, wherein,
   when the determination unit determines that the signal station adjacent to the gateway via the certain link set corresponds with the signal station of the transmission source represented by the information, the timer setting unit sets the timer value depending on an associated network, and when the determination unit determines that the signal stations do not correspond with each other, the timer setting unit sets the timer value depending on a quasi-associated network.

4. The gateway according to claim 1, wherein
   the information includes a signal station code set by a signaling connection control part (SCCP).

5. The gateway according to claim 1, wherein,
   based on information in which a link set connected to the gateway is associated with the signal station adjacent to the gateway via each of link sets, the determination unit specifies the signal station adjacent via the certain link set.

6. A communication control method for performing a relay between a public switched telephone network (PSTN) and an Internet protocol (IP) network, the communication control method comprising:
   receiving, via a certain link set, a signal including information that represents a signal station of a transmission source; and
   determining a type of a network from which the signal has been transmitted, based on determination of whether or not a signal station adjacent via the certain link set corresponds with the signal station of the transmission source represented by the information.

7. The communication control method according to claim 6, further comprising
   setting, depending on determination of the type of the network, a timer value for monitoring congestion.

8. The communication control method according to claim 7, further comprising
   setting the timer value depending on an associated network, when the determination of whether or not the signal station adjacent via the certain link set corresponds with the signal station of the transmission source represented by the information is determination that a signal station adjacent via the certain link set corresponds with a signal station of a transmission source represented by the information, and setting the timer value depending on a quasi-associated network, when the determination is determination that the signal stations do not correspond with each other.

9. A communication control system comprising:
a gateway performing a relay between a public switched telephone network (PSTN) and an Internet protocol (IP) network; and
a signal station performing signal communication with the gateway via a link set, wherein
the signal station is one of
   a first signal station adjacent to the gateway via a first link set,
   a second signal station adjacent to the gateway via a second link set, and
   a third signal station adjacent to the second signal station via a certain link set, and
the gateway comprises:
a reception unit configured to receive, via one of the first link set and the second link set, a signal including information that represents a signal station of a transmission source; and
a determination unit configured to determine a type of a network from which the signal has been transmitted, based on whether or not a signal station adjacent to the gateway via a link set used in reception of the signal corresponds with the signal station of the transmission source represented by the information.

* * * * *